United States Patent [19]
Kvalheim

[11] Patent Number: 5,536,108
[45] Date of Patent: Jul. 16, 1996

[54] LOW COHESION MATERIAL JOINT

[75] Inventor: Andrew M. Kvalheim, Petaluma, Calif.

[73] Assignee: Kval, Inc., Petaluma, Calif.

[21] Appl. No.: 394,851

[22] Filed: Feb. 27, 1995

[51] Int. Cl.⁶ .................................................. F16B 15/00
[52] U.S. Cl. ...................... 403/403; 403/382; 403/231; 108/180; 108/153
[58] Field of Search .................................. 403/401, 346, 403/347, 382, 403, 381, 404, 205, 230, 231, 283; 108/180, 192–193, 153; 312/211; 144/353, 346; 411/487, 456, 922

[56] References Cited

U.S. PATENT DOCUMENTS

| | | | |
|---|---|---|---|
| 2,496,184 | 1/1950 | Von Canon | 403/382 X |
| 4,025,215 | 5/1977 | Murdock et al. | 403/382 X |
| 4,886,326 | 12/1989 | Kuzyk | 108/153 X |

FOREIGN PATENT DOCUMENTS

| | | | |
|---|---|---|---|
| 2461138 | 3/1981 | France | 403/231 |
| 709388 | 8/1941 | Germany | 144/353 |

OTHER PUBLICATIONS

Joints in Joinery, Plate Lxx.

*Primary Examiner*—Blair Johnson
*Assistant Examiner*—Harry C. Kim
*Attorney, Agent, or Firm*—Corwin R. Horton

[57] ABSTRACT

A method of making a joint, and the joint thereby produced, in which a first element comprised of low cohesion material is joined to another element of a structure, at a position at which opposed surfaces of the first element and the other element are adjacent and generally abutting, by driving at least one nail through the first element and into the other element at a nailing point at said position. Prior to driving the nail, a nailing cavity is formed adjacent the abutting surfaces at the nailing point that extends outwardly therefrom in the direction of the surfaces and that extends a substantial distance normal to the nail direction. The nailing cavity minimizes fracture of the low cohesion material and receives fractured fragments of low cohesion material that does break from the first element by penetration of the nail therethrough, thereby to prevent wedging of fractured material between the abutting surfaces of the elements that surround the nailing point which can result in a loose and insecure joint.

20 Claims, 8 Drawing Sheets

LOW COHESION MATERIAL JOINT

BACKGROUND OF THE INVENTION

This invention relates to construction materials having limited cohesive strength, and particularly composite boards such as hardboard, particle board, and the like and to joinder of such materials in the construction process. Such materials, in the form of boards, panels and the like, may be used to fabricate many structures, such as boxes, doors, door jambs and casings, etc. They are desirable as construction materials because they are generally less expensive than materials such as plywood and lumber. However, they are more difficult to join together by driven fasteners, such as nails and staples, because of their frangibility or susceptibility to cleavage. Frequently, when a nail is driven through such a low cohesion board and into an abutted board or other construction member to join them together, the board will fracture at the exit position by impact of the penetrating nail, cleaving or dislodging fragments from the board which will be pushed by the nail in between the abutting surfaces of the boards to separate them. The result is a loose and insecure joint. This disability has heretofore limited the use of desirably inexpensive composite boards for many construction applications and particularly for prefabricated structures and substructures for buildings and the like.

SUMMARY OF THE INVENTION

This invention relates to the joinder of elements in a structure and particularly to joints between elements where at least one of the elements is comprised of low cohesion material, and especially composite board, such as medium density hardboard, fiberboard or particle board, which is prone to fracture and splintering when nailed, and particularly composite boards having a density of between 31 and 55 pounds per cubic foot. The elements are secured by nailing through the low cohesion element (nailed element) and into the other element, at a location where the opposing surfaces of the elements are adjacent and desirably generally matching or coplanar. Prior to nailing, a cavity is formed at the nail exit side of the nailed element, which is at and extends outwardly of and around the nailing position along the plane of the matching surfaces and generally normal to the nailing direction. The nailing cavity may be formed in either or both elements but is advantageously formed in the nailed element. Due to the nailing cavity, there will be no board material at the region of the nail path where fracture is most likely to occur thus decreasing the likelihood of fracture. If fracture occurs in the nail path through the nailed element in advance of the cavity, the splinters or other fractured or cleaved material will fall into the cavity and be accommodated by it so that fragments of fractured material will not be forced by the nail between the abutting surfaces of the elements surrounding the cavity. Thereby, a secure joint is more assured.

Another feature of this invention is to provide a joint comprising a low cohesion element with the foregoing attributes which may be constructed of a wide range of conventional joint profiles, including particularly rigid mitered joints, rabbet joints, tongue and groove, and the like.

Another feature of this invention is to provide a joint comprising a low cohesion element with the foregoing attributes having profiles which may be easily constructed with conventional woodworking equipment and which lend themselves to automated production and particularly joint profiles in which the nailing cavity takes the form of a continuous groove in the nailed element that interconnects a series of nailing locations and serves a nailing cavity for of nailing locations.

Another feature of this invention is to provide a joint in which nails are driven through a low cohesion material element to secure it to another element at abutted surfaces wherein the nailed low cohesion element is provided with nailing cavities at the nail exit side thereof that are sized to provide the foregoing attributes without undue sacrifice of joint strength. Specifically, the nailing cavities have a depth at least equal to the greatest transverse dimension of the nail shaft but less than 75% and preferably less than 50% of the distance through the low cohesion element in the direction from the nail exit side to the nail entry side. The cavity desirably extend outwardly from the nail exit point in the plane of abutted surfaces of the elements a distance that is greater than the greatest transverse dimension of the nail shaft and less than 20 times that dimension.

DETAILED DESCRIPTION OF THE PREFERRED EMBODIMENT

Figure 1:
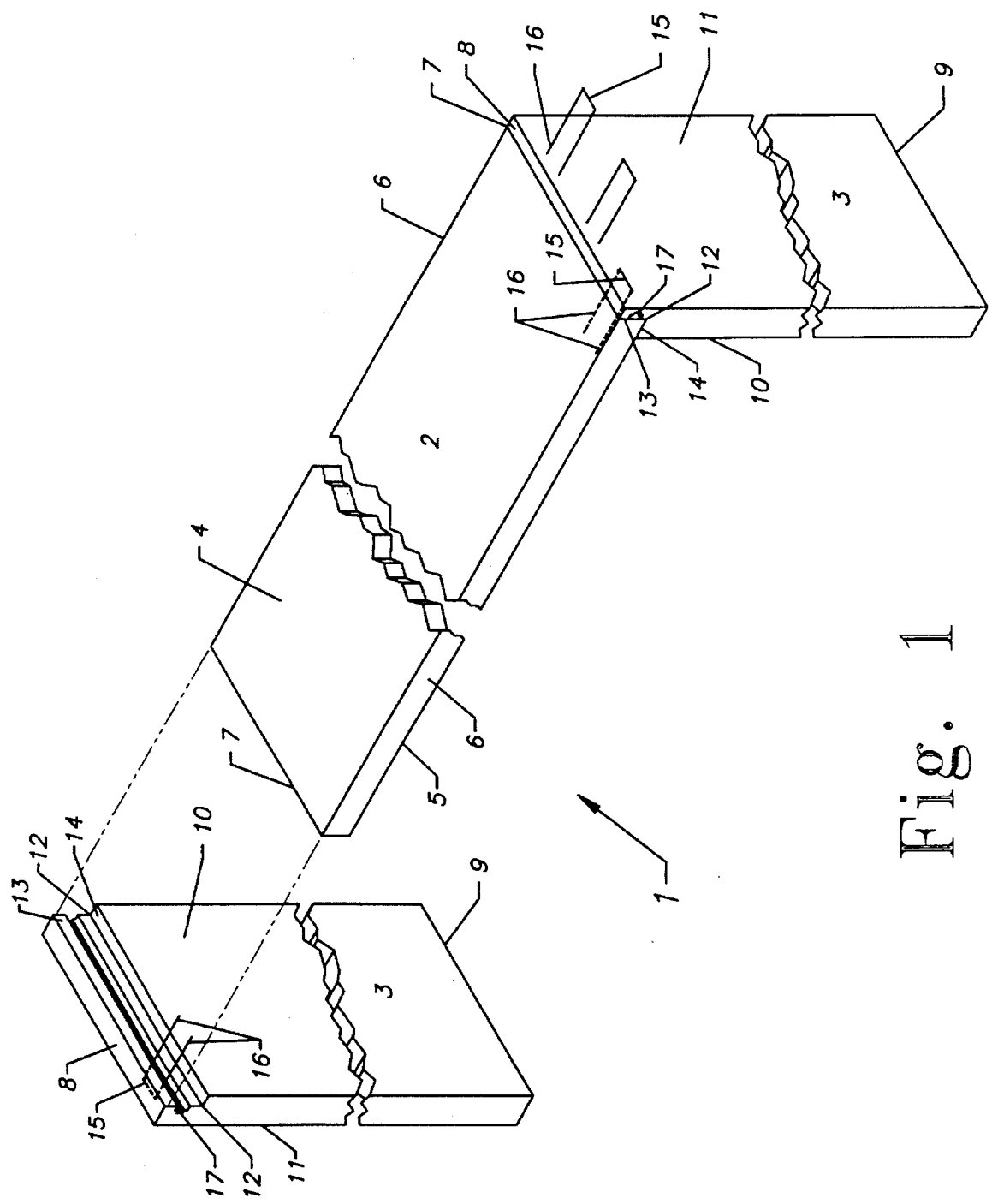
FIG. 1 is a fragmentary, partially exploded view of an embodiment of this invention in the form of a door jamb structure.

The following description illustrates the manner in which the principles of the invention are applied but is not to be construed as limiting the scope of the invention.

In the joints of this inventions, one or both of the joined elements are comprised of low cohesion material, and particularly composite board, such as resin bonded particle boards, high and medium density hardboard and fiberboard, which is prone to cleavage, fracture or splintering when nailed. Such materials are described at Chapters 21 and 22 of the Forest Products Laboratory, 1987, Wood Handbook: Wood as an Engineering Material, Agricultural Handbook 72 Rev., Washington D.C., U.S. Dept. of Agriculture, which is incorporated herein by reference. The preferred low cohesion materials are medium density fiberboard, hardboard and laminated paperboard. These materials have a density of between 31 and 55 pounds per cubic foot (pcf) and preferably in the range of 44 to 50 pcf. They are generally capable of being secured by nails or the like, subject to the fracturing and cleavage difficulties mentioned. These materials are generally prepared from lofted lignocellulosic fibers which are variously treated with resins and other bonding agents and consolidated to the desired density with heat and pressure. Medium density fiberboard, the most preferred material, generally contains sufficient resin or other bonding agents so that edges are reasonably tight and do not require special edge bonding. Such fiberboards are thus suitable for and are increasingly in furniture applications, moldings, doors and the like.

The elements are joined at surfaces with generally conforming profiles which abut each other over a substantial area so that a firm seat is provided to resist bending moments. Such joints may be angle joints, i.e. where the elements are positioned at angle to one another, such as a right angle joint. Or, the members joined may be in parallel relationship, for example a lap joint. The joints may be mitered and/or rabbeted in a conventional manner, formed in a more complex mating profile, e.g. tongue and groove, or the elements may simply be joined at flush parallel surfaces.

The joints are secured by nails driven through a first (nailed) element and into the second element at the joined surfaces. As used herein, the term "nail" is used in its generic sense, to include brads, spikes, pins, staples and other slender fasteners that are driven to penetrate through the materials to be joined to secure them by friction.

In accordance with this invention cavities are provided at the nail exit positions in the nailed element of the joint. These cavities may take many configurations. In the most desirable form the cavity surrounds the nail exit point, extending outwardly therefrom a substantial distance in the plane of abutted surfaces of the elements and preferably for a distance equal to 5 or 10 times the greatest transverse dimension of the nail shaft exiting the nailed element. While the nailing cavity may extend outwardly possibly even more 20 times the greatest transverse dimension, a smaller extension is usually preferred in order to leave an area of abutted surface between the elements that is sufficiently large to insure a secure joint.

Cavities for a series of nailing locations along the joint may be conveniently fashioned, as will be illustrated, by extending a slot or groove along the joint connecting the locations and providing each with a generally rectangular nailing cavity. Alternatively, a discrete cavity may be provide at each nail location. The nailing cavity should be deep enough in the direction normal to the exit surface of the nailed element to accommodate a minimum amount of cleaved or fractured material and desirably a depth greater than the greatest transverse dimension of the nail shaft exiting and preferably greater than twice that dimension. Preferably, the depth will be less than 50% of the thickness of the nailed element at the nail position and desirably is less than 75% of that thickness so as not to decrease unduly the resistance to bending at the joint or resistance to fracture of the element throughout the entire nail path.

The nailing cavity is advantageously tapered inwardly in the direction inwardly of the nailed element of the exit side thereof, for example in a conical shape or a groove with inwardly slanting sides. Such tapering provides improved support against fracture upon penetration of the nail through the element.

Referring to FIG. 1 of the drawings, a door jamb structure 1 comprises a horizontal element, header 2, and two vertical jamb elements 3. Header 2 is of rectangular configuration, with rectangular top side 4 and bottom side 5, rectangular sides 6 and rectangular ends 7. Ends 7 abut respective top ends 8 of vertical elements 3. Vertical elements 3 are generally rectangular and extend downwardly to rest at their bottom ends 9 on a floor or other support (not shown). Elements 3 have a side 10 facing header 2 and an opposed side 11 parallel with side 10.

End 8 of each vertical jamb element has a notch or rabbet 12 along its width facing header 2 to provide an inset vertical wall 13 and a horizontal ledge 14 to receive an end 7 of header 2 with the bottom side 5 thereof seated against horizontal ledge 14 and end 7 thereof seated against wall 3. The joints thus formed are secured by a series of staples 15 spaced at positions along rabbet 12 vertically midway along wall 13 of rabbet 12. Staples 15 are driven through side 11 of wall 13 of each element 3 so that each of shafts or nails 16 thereof exit wall 13 of rabbet 12 and penetrate into end 7 of header 2 seated thereagainst.

Figure 2:
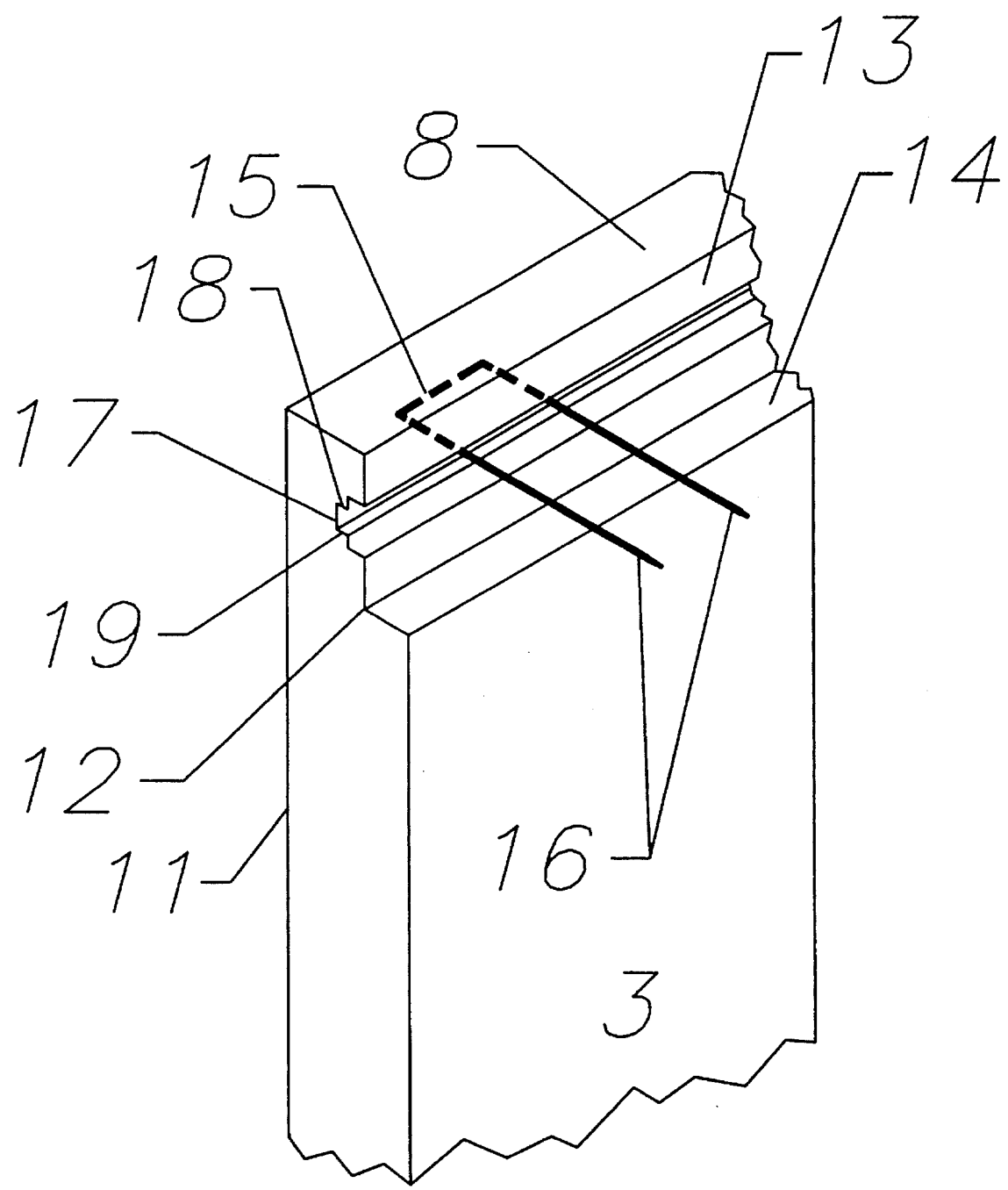
FIG. 2 is an enlarged fragmentary part of the view of FIG. 1.

A groove 17 is provided in wall 13 extending along rabbet 12 at the vertical midpoint of wall 13 to serve as a nailing cavity in accordance with this invention at the exit locations of nails 16 of staples 15 at wall 13. Groove 17 is of stepped configuration in the vertical direction, with steps 18 and 19, so that the groove is narrowest at its deepest point and widest at the margins with wall 13. As best shown in FIG. 2, the width of groove 17 in the vertical direction is about four times the width of the shafts of nails 16 in the vertical direction, which is the largest transverse dimension of nails 16, and the depth of groove 17 is about 20% of the thickness of wall 13.

Figure 3:
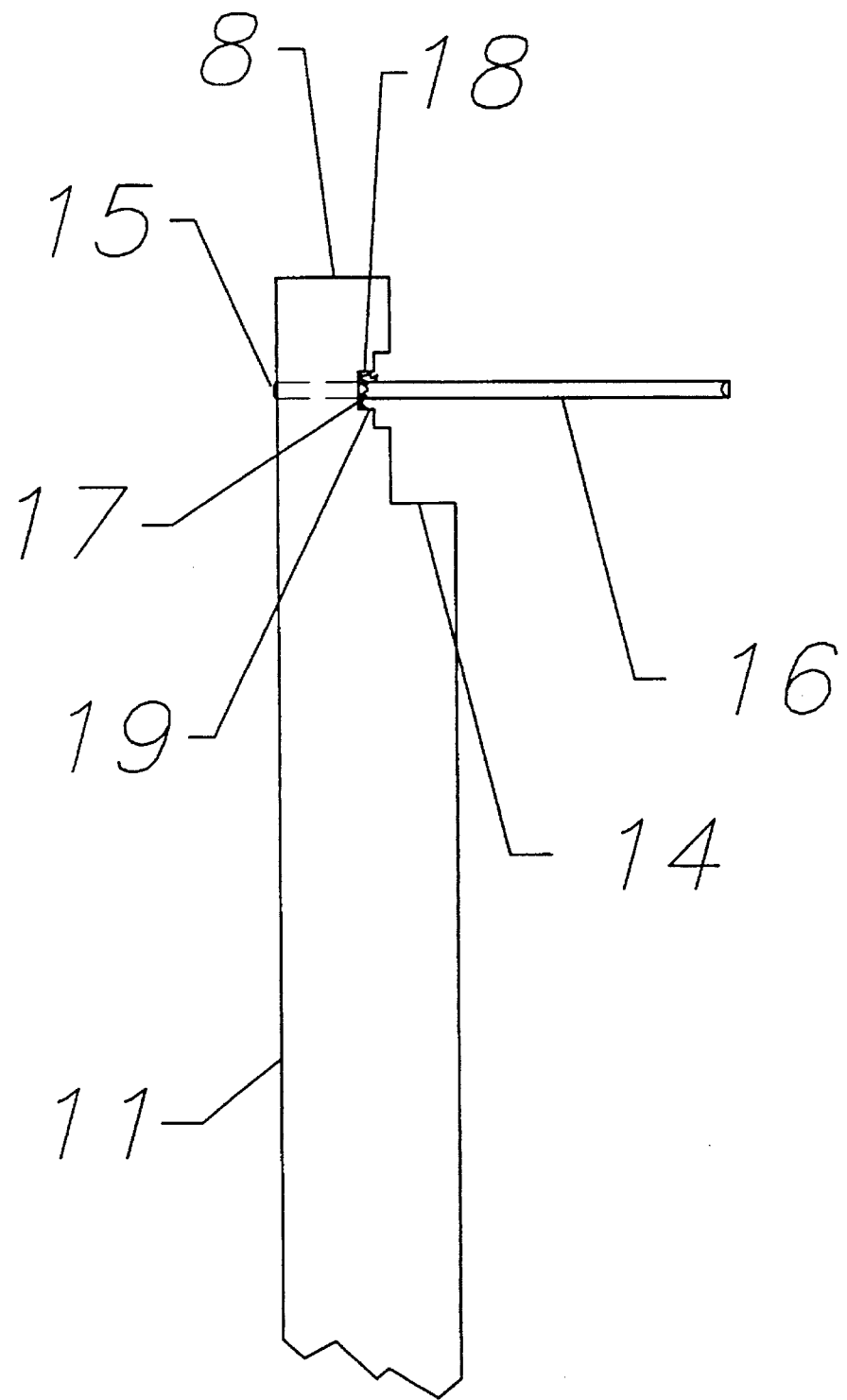
FIG. 3 is the fragmentary, partially exploded view of FIG. 2 illustrating the accommodation in a nailing cavity of this invention of low cohesion material that has been broken loose by nail penetration.
Figure 4:
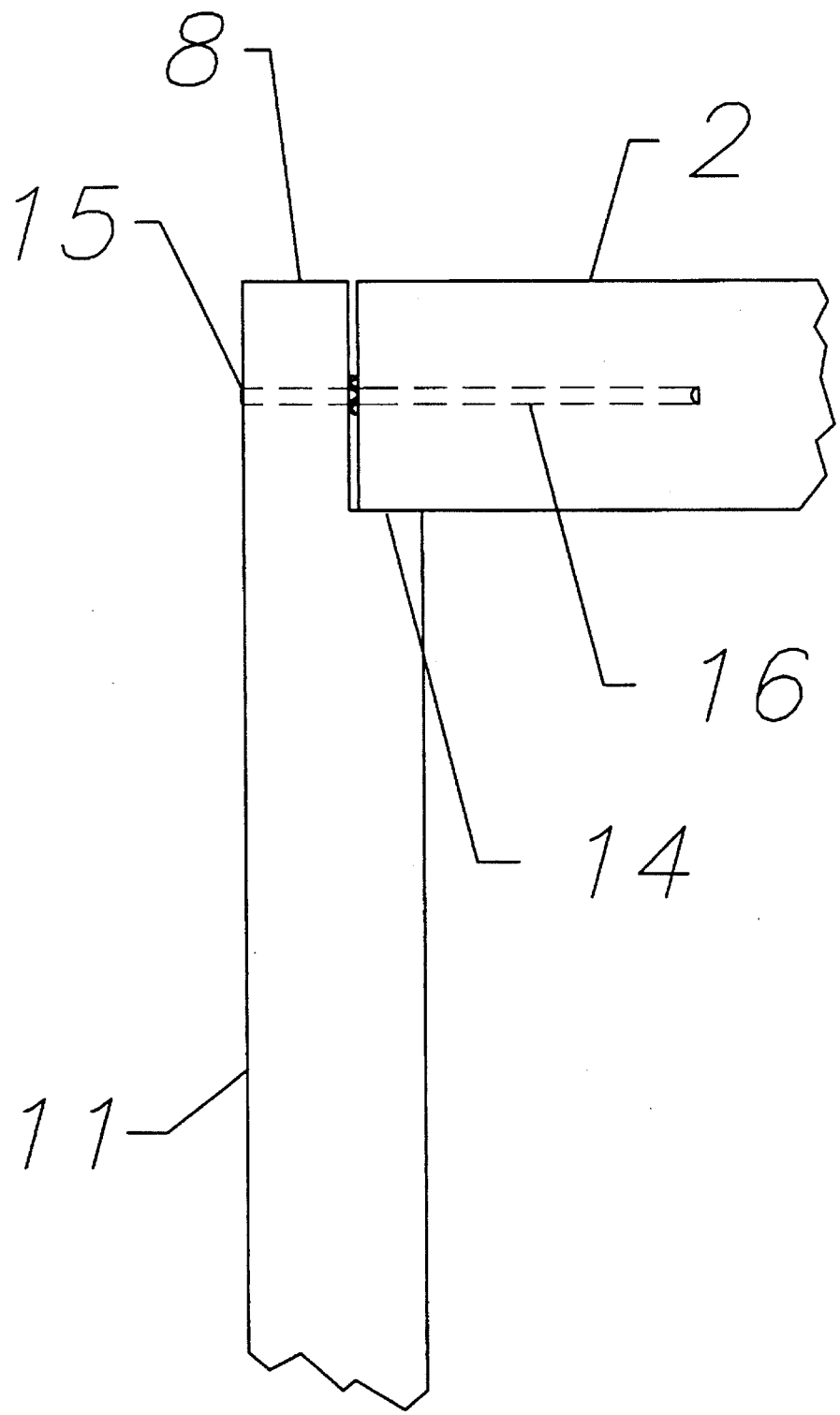
FIG. 4 is a fragmentary, partially exploded side view of the same joint profile as in FIG. 2 but without the nailing cavity of this invention, illustrating the wedging between abutted surfaces of joined elements of low cohesion material fractured loose by nail penetration of low cohesion element, with consequent loosing of the joint.

As illustrated in FIG. 3, in the event that fracturing occurs in the nail path through wall 13, the fractured material will fall into groove 17 and be accommodated in this cavity so that fragments of fractured material will not be forced by the nail between the abutting surfaces of wall 13 and header end 7 surrounding the cavity. By contrast, as illustrated in FIG. 4 showing the same joint configuration without groove 17 material fractured from wall 13 at the exit location of nails 16 can be forced outwardly therefrom to wedge between the surfaces of wall 13 and header end 7 thereby separating them to leave an insecure joint.

Figure 5:
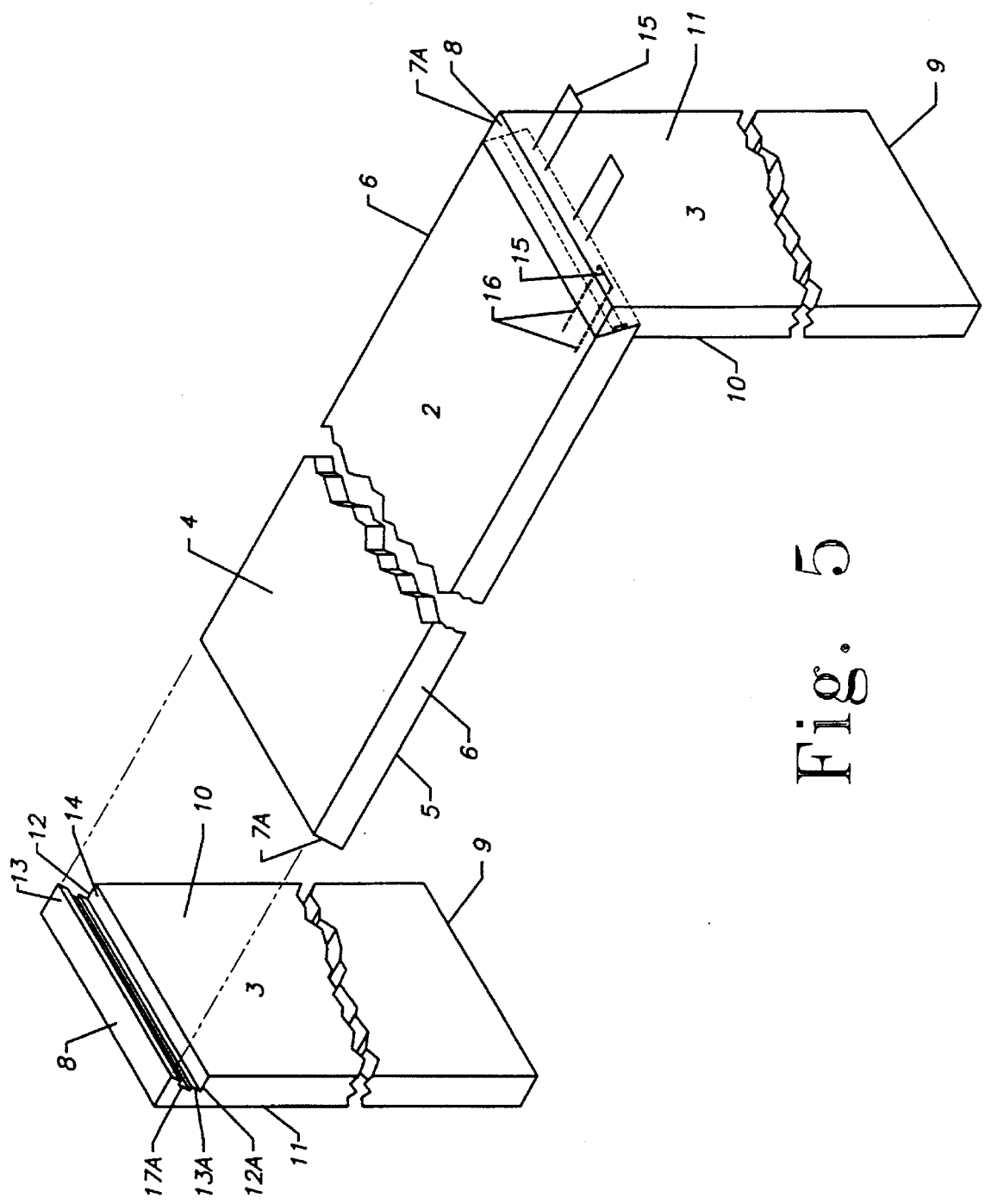
FIG. 5 is a fragmentary, partially exploded view of another embodiment of this invention in the form of a door jamb structure having rabbeted joints.

FIG. 5 illustrates another joint in accordance with this invention, and particularly a joint having a mitered profile. This joint is configured as in the embodiment of FIG. 1, except that end 7A of header 2 is beveled at an acute angle extending from bottom side 5 so that at edge thereof at the bottom side 5 is the leading edge toward the respective side member 2 and the to edge thereof at the top side 4 is the trailing edge. Wall 13A of rabbet 12A is similarly beveled to conform to end 7A so that end 7A seats thereagainst when they are abutted. Groove 17A in the surface of wall 13A is of rectangular configuration and is located at the vertical midpoint of wall 13A. As in FIG. 1 staples 15 are driven through wall 11 in the direction normal thereto to exit at the centerline of groove 17A in wall 13A and penetrate end 7A abutted against wall 13A.

The foregoing embodiments of the invention are uniquely suited for high speed fabrication with conventional milling equipment and automatic nailing and stapling equipment. The groove forming the nailing cavity of this invention can be cut by dadoing in the same operation in which the element is rabbeted.

Figure 6:
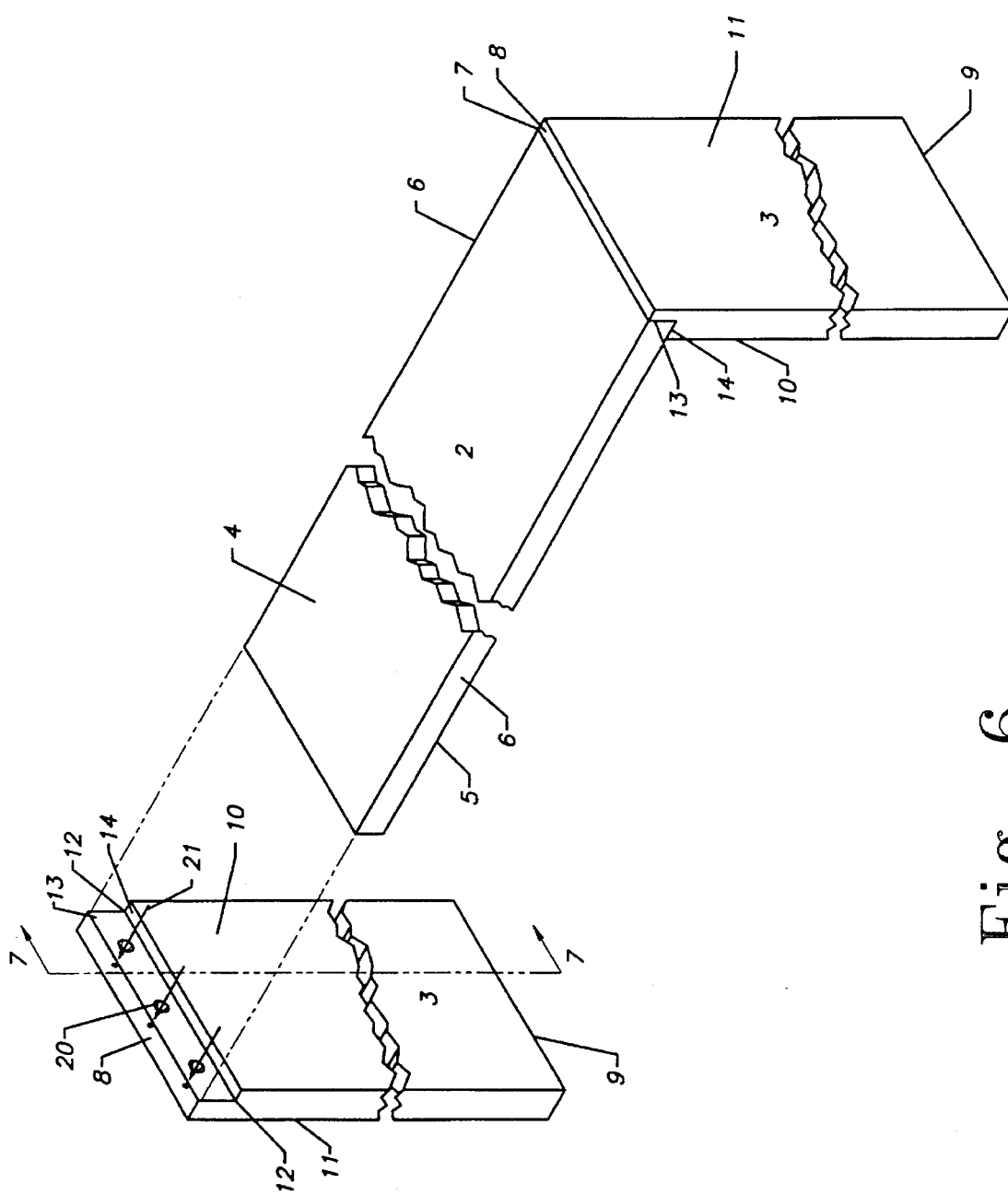
FIG. 6 is a fragmentary, partially exploded view of yet another embodiment of this invention in the form of a door jamb structure having rabbeted joints in which each nail position is provided with a separate nailing cavity of this invention.
Figure 7:
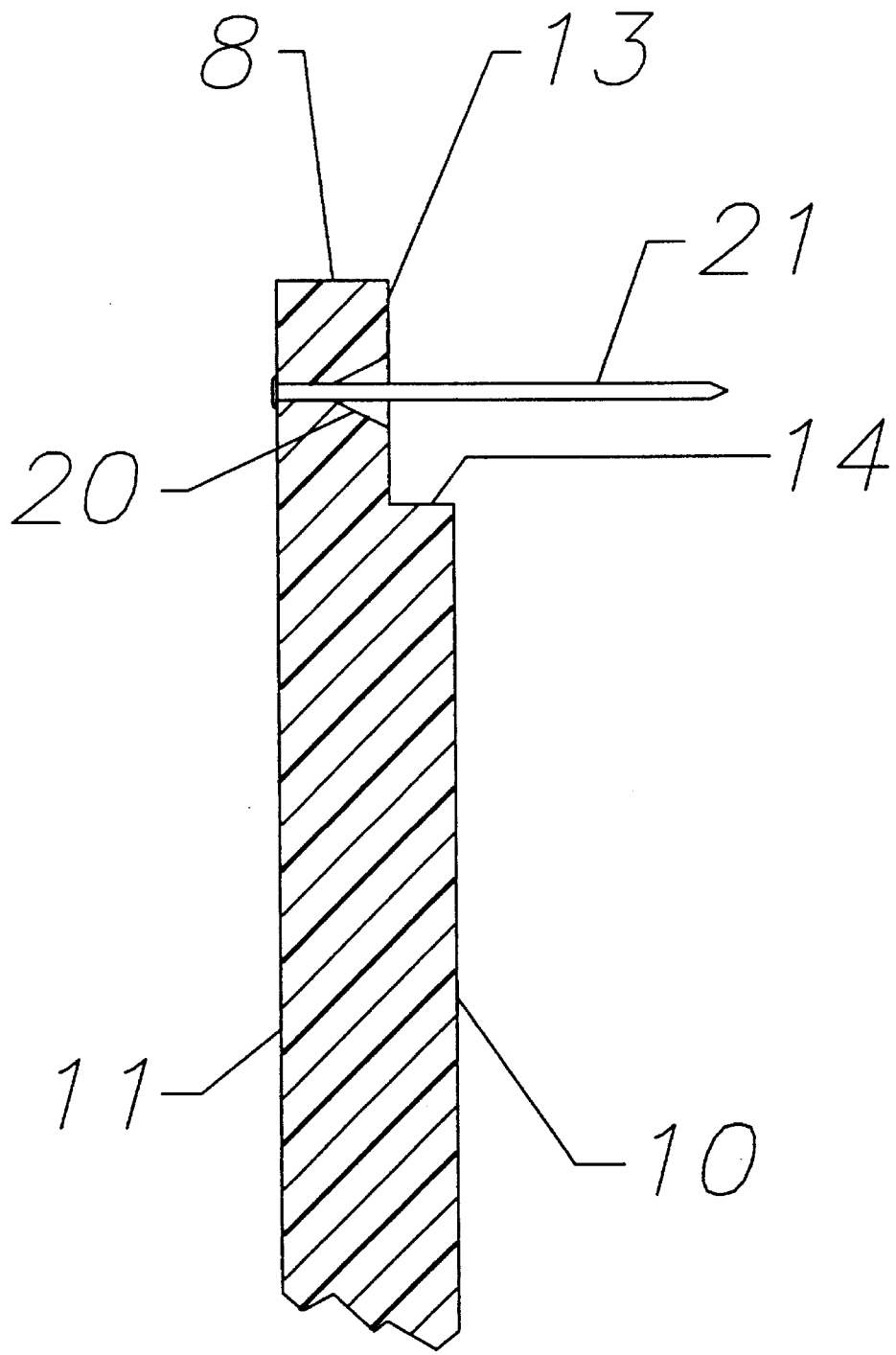
FIG. 7 is a fragmentary cross-sectional view taken along the line 7—7 of FIG. 6.

FIGS. 6 and 7 illustrate a joint in accordance with this invention with the same joint profile as in the embodiment of FIGS. 1 and 2, except for the configuration of the cavities provided at the exit points of the nails from wall 13 of rabbet 12. Instead of a continuous groove extending along rabbet 12, an individual countersink or conical hole 20 is provided at each desired nailing point. Nails 21 are driven through wall 13 to exit at the apex of each conical hole 20 to secure the joint.

Figure 8:
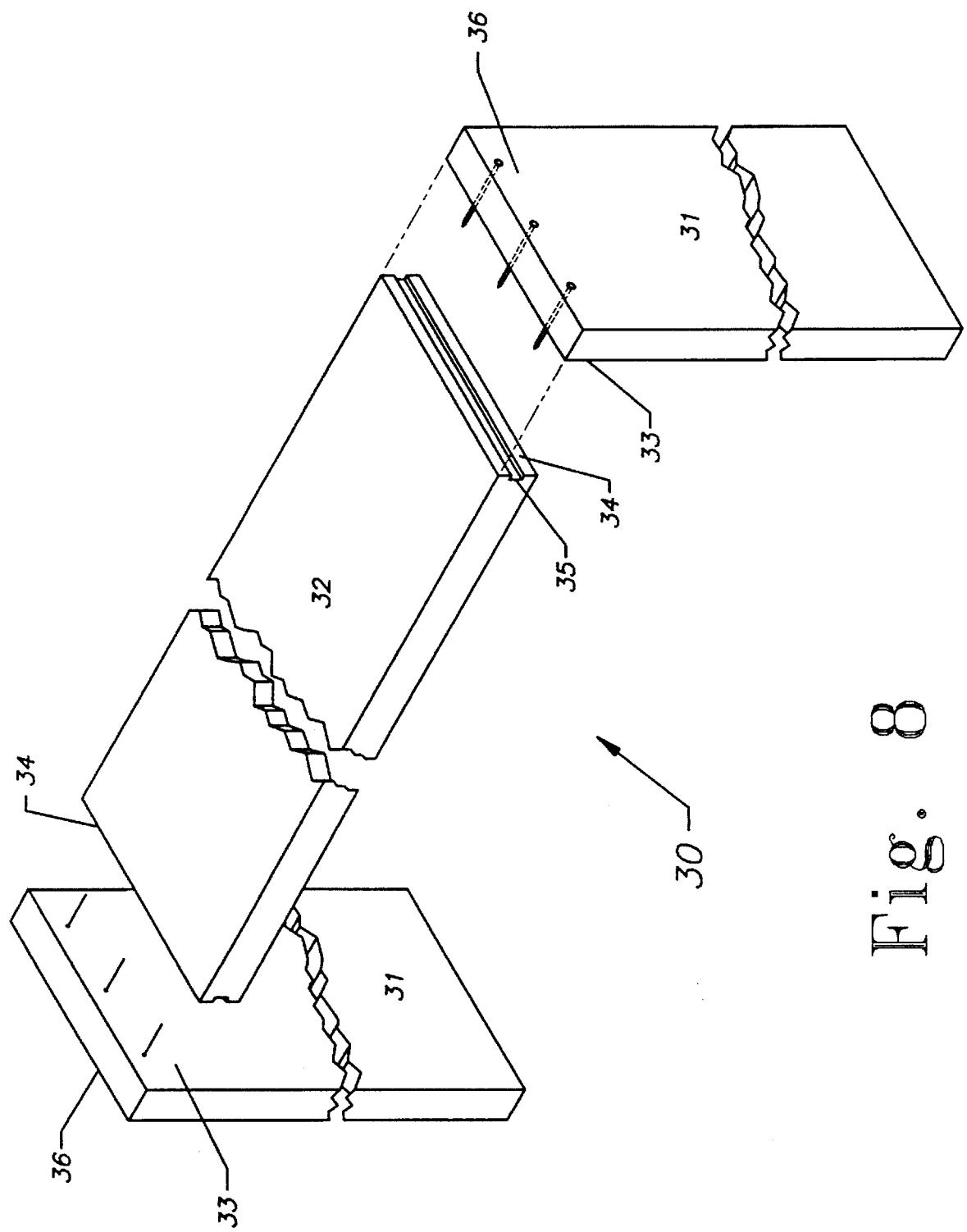
FIG. 8 is a fragmentary, partially exploded view of another embodiment of this invention in the form of a door jamb structure having flush joint, with nailing cavities in the form of a groove in the end surface of the header.

In the embodiment of FIG. 8 a flush joint in accordance with this invention is illustrated. Additionally, this embodiment illustrates the alternative of creating the cavities at the nail exit points from the nailed element by forming a groove or other cavity in the nailed element adjacent the nail exit points. Specifically, in the a door jamb structure 30 of FIG. 7, elements 31 and 32 are joined at right angles. Side 33 of element 31 has a flat profile without any grooves or other cavities, while end 34 of element which abuts side 33 has a flat profile with a groove 35 extending therealong at the midpoint. Nails driven through side 36 of element 31 to exit at spaced positions along groove 35 at the centerline thereof and penetrate into end 34 beyond groove 35 to secure the joint. While it is generally more advantageous to place the nailing cavity in the nailed element, for some applications it may be more convenient to have the nailing cavity in the element to which it is nailed, as in this example.

I claim:

1. In a method of joining a first element comprised of low cohesion material to a second element of a structure with at least one nail comprising a shaft to be driven through the first element, at a position at which opposed surfaces of the first element and the second element are adjacent and generally abutting, the shaft of the nail being driven in a nailing direction through the first element, from a nail entry side remote from the abutting surfaces to exit the first element at a nail exiting point on the side adjacent to the second element, and into the second element, the improvement comprising, prior to driving the nail, forming a nailing cavity adjacent the abutting surfaces at the nail exiting point from the first element that extends outwardly therefrom in the direction of the surfaces and that extends a substantial distance normal to the nailing direction to minimize fracture of the low cohesion material from the first element by penetration of the nail therethrough and to receive so fractured material, whereby to prevent wedging of the material between the abutting surfaces of the elements that surround the nail exiting point.

2. A method as in claim 1 and wherein the step of forming said nailing cavity comprises forming said nailing cavity in the first element at the side thereof adjacent to the second element.

3. A method as in claim 2 and wherein the step of forming said nailing cavity comprises forming said nailing cavity having a depth in the direction from the side of the first element adjacent to the second element to the nail entry side thereof of less than 75% of the thickness of the first element at the nail exiting point and extending outwardly from the nail exiting point in the plane of the abutting surfaces of the elements a distance that is greater than the greatest transverse dimension of the nail shaft at the exiting point.

4. A method as in claim 2 and wherein the step of forming the nailing cavity comprises forming said nailing cavity having a depth in the direction from the side of the first element adjacent to the second element to the nail entry side thereof greater than the greatest transverse dimension of the nail shaft and less than 50% of the thickness of the first element at the nail exiting point and extending outwardly from the nail exiting point in the plane of the abutting surfaces of the elements a distance that is greater than twice and less than 20 times the greatest transverse dimension of the nail shaft at the exiting point.

5. A method as in claim 2 and wherein the step of forming said nailing cavity comprises forming a groove along the nail exiting side of the first element at the abutting surfaces to serve as said nailing cavity for a plurality of nails and comprising the further step of driving said plurality of nails into the side of the first element remote from the abutting surfaces at spaced locations along the groove at which the nails exit the first element through the groove.

6. A method as in claim 5 and including the step of forming in one of the elements, at the position where the elements abut, a notch that is shaped to receive an abutting portion of the other element whereby to form a rabbet joint.

7. A method as in claim 1 and wherein said low cohesion material is composite board.

8. A method as in claim 7 and wherein said composite board is medium density hardboard comprising resin-bonded wood particles.

9. A method as in claim 7 and wherein the nails comprise staples.

10. A joint between a first element comprised of low cohesion material and second element of a structure, at opposed and generally abutting surfaces of the elements, secured by at least one nail comprising a shaft driven in a nailing direction into a nail entry side of the first element remote from the abutting surfaces, through the first element to exit the first element at a nail exiting point on the side adjacent to the second element and into the second element at the abutting surfaces, the joint having a nailing cavity adjacent the abutting surfaces at the nail exiting point that extends outwardly therefrom in the direction of the surfaces and that extends a substantial distance normal to the nail direction to minimize fracture of said low cohesion material from the first element by penetration of the nail therethrough and to receive so fractured material, whereby to prevent wedging of the material between the abutting surfaces of the elements that surrounds the exiting point.

11. A joint as in claim 10 and wherein said nailing cavity is located in the first element at the side of the first element adjacent to the second element thereof.

12. A joint as in claim 11 and wherein said nailing cavity has a depth in the direction from the side of the first element adjacent to the second element to the nail entry side thereof of less than 75% of the thickness of the first element at the nail exiting point and extends outwardly from the nail exiting point in the plane of the abutting surfaces of the elements a distance that is greater than the greatest transverse dimension of the shaft of the nail.

13. A joint as in claim 11 and wherein said nailing cavity has a depth in the direction from the side of the first element adjacent to the second element to the nail entry side thereof of less than 50% of the thickness of the first element at the nail exiting point and extends outwardly from the nail exiting point in the plane of the abutting surfaces of the elements a distance that is less than 20 times the greatest transverse dimension of said nail shaft.

14. A joint as in claim 11 and wherein said joint is secured by a line of spaced apart nails driven into the nail entry side of the first element through the first element and into the second element at the abutting surfaces and the nailing cavity for each of the nails comprises a continuous groove extending along the line of nails at the nail exiting points thereof from the first element.

15. A joint as in claim 14 and wherein the first element is notched and the second element extends at a right angle thereto with a terminal portion thereof received in the notch.

16. A joint as in claim 15 and wherein the nails comprise legs of staples.

17. A door jamb comprising a horizontal header and two vertical side members, the header being joined at either end thereof to the upper end of a respective vertical side member by a joint as described in claim 15 and wherein in each joint the header comprises one of the elements thereof and the respective side member comprises the other element thereof.

18. A joint as in claim 10 and wherein said low cohesion material is composite board susceptible to splintering or cleavage at the nail exiting side thereof when nailed.

19. A joint as in claim 18 and wherein said composite board is fiberboard or hardboard having a density of between 31 and 55 pcf.

20. A joint between a composite board element composed of lignocellulose fibers consolidated under heat and pressure and a second element of a structure, at opposed and generally abutting surfaces of the elements, the joint being secured by a line of spaced apart nails, each nail driven into the side of the first element remote from the abutting surfaces, through the first element to exit the first element at a nail exiting point on the side adjacent to the second element and into the second element at the abutting surfaces, and having a nailing cavity adjacent the abutting surfaces at the nail exiting points comprising a continuous groove extending along the line of nails at the nail exiting points thereof from the first element to minimize fracture of material from the first element by penetration of the nails therethrough and to receive so fractured material, whereby to prevent wedging of the material between the abutting surfaces of the elements that surround the nail exiting points.

* * * * *